A. SADLOCK.
RAIL JOINT.
APPLICATION FILED APR. 24, 1914.
1,100,784.
Patented June 23, 1914.
Fig. 1.
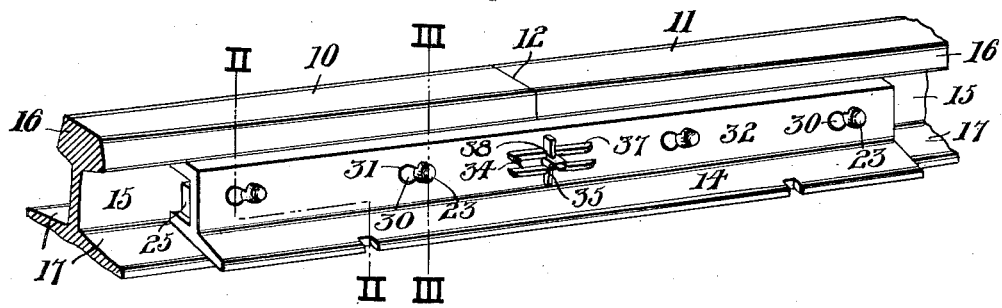
Fig. 2.   Fig. 3.
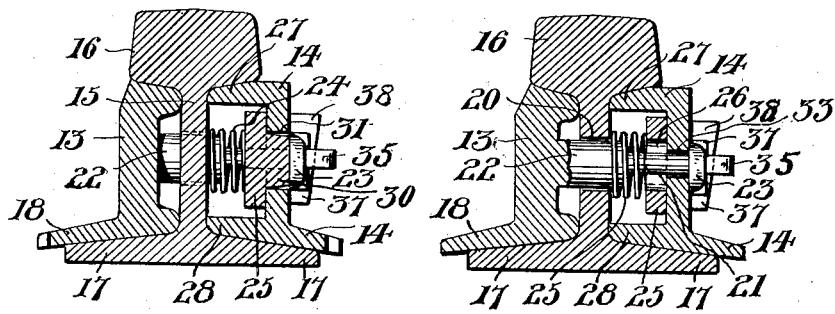
Fig. 4.
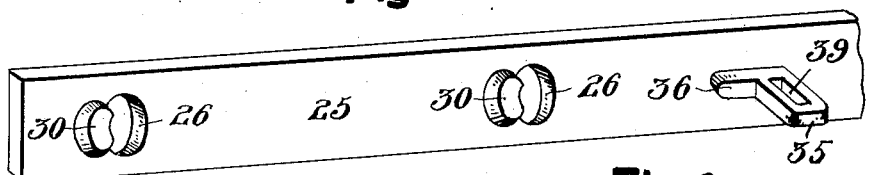
Fig. 5   Fig. 6.
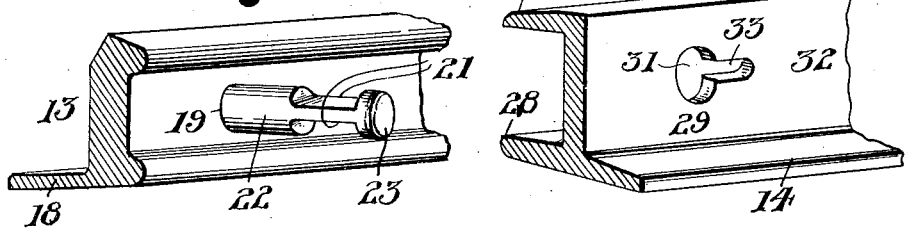
Witnesses
S. Z. Torosiewicz
T. R. Bryant
Inventor
Andrew Sadlock
By
N. M. Wilson
Attorney

UNITED STATES PATENT OFFICE.

ANDREW SADLOCK, OF UNIONTOWN, PENNSYLVANIA.

RAIL-JOINT.

1,100,784. Specification of Letters Patent. Patented June 23, 1914.

Application filed April 24, 1914. Serial No. 834,136.

*To all whom it may concern:*

Be it known that I, ANDREW SADLOCK, a subject of the Emperor of Austria-Hungary, residing at Uniontown, in the county of Fayette and State of Pennsylvania, have invented certain new and useful Improvements in Rail-Joints, of which the following is a specification.

This invention relates to new and useful improvements in rail joints.

The primary object of this invention is to provide oppositely positioned fish plates forming a locking means at the jointure of railway rails having a resiliently mounted locking bar automatically engaging one of the fish plates for securing the two plates in a locked relative position.

A further object is to provide a means for assembling opposite fish plates upon the web portions of adjacent rail ends without the employment of any screws or turn nuts but at the same time affording an efficient retaining means for the fish plates in their maintenance of a rigid and secure joint.

A still further object is to provide a resilient presser plate upon the bolt connections between two fish plates of a rail joint adapted for the automatic locking of said plates upon the rails upon a longitudinal movement of one of the fish plates.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a perspective view of the locking fish plate side of a rail joint, the rails being broken away. Fig. 2 is a transverse vertical sectional view taken upon line II—II of Fig. 1. Fig. 3 is a similar view taken upon line III—III of Fig. 1. Fig. 4 is a perspective view of a portion of the shiftable lock bar. Fig. 5 is a perspective view of a portion of one of the fish plates, and Fig. 6 is a perspective view of a portion of the oppositely positioned fish plate employed in forming the rail joint.

Referring more in detail to the drawings, the end portions 10 and 11 of two railway rails are illustrated having their adjacent ends in substantial contact as at 12 and the joint therebetween rigidly maintained by the positioning of the fish plates 13 and 14 upon opposite sides of the rail ends and engaging the webs 15 of the rails as well as the lower faces of the treads 16 and the upper faces of the base flanges 17.

The fish plate 13 is formed of substantially the usual configuration with a base flange 18 positioned upon the flanges 17 of the two rails 10 and 11, while a plurality of bolts 19 are rigidly secured projecting from the inner face of said fish plate and adapted to project through the circular perforations 20 of the rail webs 15. The bolts 19 are provided with opposite cut away portions 21 intermediate their lengths and thus forming the cylindrical base portions 22 normally positioned through the said perforations 20 when the fish plate is assembled upon the rails and with terminal heads 23 for the purpose hereinafter set forth. With the fish plate 13 so positioned upon the rails, it is designed to provide helical springs 24 mounted upon the bolts 19 and adapted to bear upon the inner surface of a lock bar 25, which bar is mounted upon the bolts 19 by means of circular openings 26 which receive the said bolts therethrough and by which construction it will be noted, an outward pressure is exerted upon the bar 25 when said springs are compressed.

The fish plate 14 is provided with opposite upper and lower inwardly projecting flanges 27 and 28 respectively which inclose the lock bar 25 when the key-hole slots 29 of the fish plate 14 are positioned with the bolts 19 projecting therethrough and with the inner edges of the flanges 27 and 28 abutting against the rail webs 15. The bar 25 is provided with circular lugs 30 of proper size to be received within the circular portions 31 of the key-hole slots 29, the said lugs being positioned adjacent the openings 26 of the said lock bar. Upon positioning the fish plate 14 with the bolts 19 projecting through the circular portions 31 of the slots 29, the rear face of the web portion 32 of the fish plate 14 will engage the outer flattened faces of said lugs 30 and whereupon an inward pressure upon the fish plate 14 and with the opposite fish plate 13 stationary, results in forcing the lock bar 25 toward the webs 15 and thus compressing the springs 24 while upon the elongated portions 33 of the key-hole slots 29 moving into alinement with the reduced portions 21 of the bolts 19, a sliding longitudinal movement imparted to said fish plate 14 forces the fish plate 14 into locking engagement upon the bolts 19 and beneath the bolt heads 23. Upon such movement, the same is limited by an engagement of the reduced portion of the bolts 19 with the closed ends of the slot portions 33 and at which time the lugs 30 will be brought into alinement with the circular portions 31 of the key-hole slots and the springs 24 will automatically force outwardly the lock bar 25 with the said lugs seated within the corresponding slot portions and with the fish plates locked in opposite positions upon the rails.

The shiftable plate 14 is provided with a substantially central slot 34 adapted to receive therethrough the outwardly projecting pin 35 carried by the locked bar 25 while an oblong lug 36 carried by said bar adjacent the base of said pin will be positioned within the slot 34 in a similar manner to the described engagement of the lugs 30 with the slot portions 31. Ribs 37 are provided upon the outer face of the fish plate 14 in parallelism upon opposite sides of the slot 34 and are provided with interrupted central portions adapted for the accommodation of a locking key or cotter 38 to be placed through the perforation 39 of the pin 35 and thereby further retaining the fish plates upon the rails.

The present detailed description of the device clearly illustrates the operable positioning of the elements in forming a locking construction of fish plates for a rail joint and without the employment of any form of turn screw devices.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim as new is:—

1. A device of the class described comprising in combination with two abutting rail ends, of oppositely positioned fish plates engaging the opposite sides of the webs of said rails, the said rails provided with perforations therethrough between said plates, bolts rigidly mounted upon one of said plates and projecting through said perforations, the other of said fish plates provided with perforations adapted for the reception of said bolts therethrough, a locking bar resiliently positioned between said perforated fish plate and the webs of said rails and adapted for locking engagement between said bolts and perforated plate when said plates are assembled.

2. A rail joint comprising two abutting rail ends provided with transverse perforations through the webs thereof, a fish plate engaging one side of said webs, projecting bolts having reduced portions and headed ends carried by said plate and projecting through said perforations, a lock bar provided with perforations therethrough and mounted upon said bolts on the opposite side of said webs from said fish plate, resilient encircling springs upon said bolts between said web and bar, outwardly projecting lugs upon said bar adjacent to the perforations of said bar, another fish plate provided with key-hole slots and with said slots mounted upon said bolts with the narrow portions of said slots engaging the reduced portions of said bolts and with said bar lugs seated within the circular portions of said key-hole slots.

3. A rail joint comprising two abutting rail ends provided with transverse perforations through the webs thereof, a fish plate engaging one side of said webs, projecting bolts having reduced portions and headed ends carried by said plate and projecting through said perforations, a lock bar provided with perforations therethrough and mounted upon said bolts on the opposite side of said webs from said fish plate, resilient encircling springs upon said bolts between said web and bar, outwardly projecting lugs upon said bar adjacent to the perforations of said bar, another fish plate provided with key-hole slots and with said slots mounted upon said bolts with the narrow portions of said slots engaging the reduced portions of said bolts and with said bar lugs seated within the circular portions of said key-hole slots, an outwardly projecting perforated pin carried by said bar, an oblong lug upon said bar at the base of said pin, said slotted fish plate provided with a substantially central longitudinal slot adapted for the reception of said pin and oblong lug, oppositely positioned ribs carried by said perforated plate and a locking cotter adapted for reception within the perforation of said pin and engaging said ribs.

In testimony whereof I affix my signature in presence of two witnesses.

ANDREW SADLOCK.

Witnesses:
STEVE WILCOCK,
SIGMUND SENESAY.

---

Copies of this patent may be obtained for five cents each, by addressing the "Commissioner of Patents, Washington, D. C."